United States Patent
Neidhardt et al.

(10) Patent No.: US 7,904,091 B2
(45) Date of Patent: Mar. 8, 2011

(54) METHOD AND SYSTEM FOR PREDICTING BLOCKING IN A NETWORK

(75) Inventors: Arnold Neidhardt, Middletown, NJ (US); Judith L. Jerkins, Tinton Falls, NJ (US); Komandur Krishnan, Bridgewater, NJ (US)

(73) Assignee: Telcordia Licensing Company, LLC, Piscataway, NJ (US)

( * ) Notice: Subject to any disclaimer, the term of this patent is extended or adjusted under 35 U.S.C. 154(b) by 0 days.

(21) Appl. No.: 11/125,721

(22) Filed: May 10, 2005

(65) Prior Publication Data

US 2005/0250513 A1 Nov. 10, 2005

Related U.S. Application Data

(60) Provisional application No. 60/569,569, filed on May 10, 2004.

(51) Int. Cl.
*H04W 40/00* (2009.01)
(52) U.S. Cl. .......................... 455/445; 455/446; 455/453
(58) Field of Classification Search .................. 455/453, 455/445–446
See application file for complete search history.

(56) References Cited

U.S. PATENT DOCUMENTS

| | | | | |
|---|---|---|---|---|
| 5,719,854 | A * | 2/1998 | Choudhury et al. | 370/231 |
| 5,881,049 | A * | 3/1999 | Beshai et al. | 370/395.21 |
| 6,041,239 | A * | 3/2000 | Reed et al. | 455/453 |
| 6,049,593 | A * | 4/2000 | Acampora | 379/56.2 |
| 6,324,401 | B1 * | 11/2001 | De Hoz Garcia-Bellido et al. | 455/442 |
| 6,418,324 | B1 * | 7/2002 | Doviak et al. | 455/426.1 |
| 6,532,366 | B1 * | 3/2003 | Chung et al. | 455/445 |
| 7,319,675 | B1 * | 1/2008 | Chastain | 370/252 |
| 2002/0037730 | A1 * | 3/2002 | Schwartz | 455/452 |

OTHER PUBLICATIONS

Zaim et al., May 2003, IEEE Transactions on Vehicular Technology, vol. 52, No. 3, pp. 622-636.*
Leonard E. Miller, Apr. 2002, National Institue of Standards and Technology.*

* cited by examiner

*Primary Examiner* — Lester Kincaid
*Assistant Examiner* — Steven Lim
(74) *Attorney, Agent, or Firm* — Fitch, Even, Tabin & Flannery

(57) ABSTRACT

A method for estimating the performance of GSM cellular networks that employ "directed retry", in which a call blocked by the sector of its initial attempt may be redirected to an alternative sector that is also accessible to the call, thereby increasing the effective capacity of the network. The method may be stored in a memory and executed as instructions by a microprocessor.

22 Claims, 4 Drawing Sheets

METHOD AND SYSTEM FOR PREDICTING BLOCKING IN A NETWORK

CROSS-REFERENCE TO RELATED APPLICATIONS

This application claims the benefit of the filing date of U.S. Provisional Patent Application No. 60/569,569, filed May 10, 2004, the disclosure of which is hereby incorporated herein by reference.

BACKGROUND OF THE INVENTION

The present invention relates to methods and systems for calculating a blocking probability associated with a network.

In recent years, the demand for wireless voice and data services has increased dramatically. In order to keep up with these demands, wireless network providers have focused on methods to increase the capacity of their existing wireless networks. Various methods have been employed to avoid users being denied access to the network either during call initiation or roaming.

For example, mobile communications is typically implemented using a cellular radio network as shown, for example, in FIG. 1. As shown, a cellular network 100 is divided into a plurality of cells 124. Each cell defines an individual radio coverage area, i.e., a geographic area, served by a radio base station 126. In a GSM cellular network, individual calls within a single cell use different combinations of frequencies and slots. The frequencies may be reused by other cells provided there is no interference with other cells. The frequency reuse pattern of the cells is dependent on the distance between the cells and the radio transmission power.

In modern cellular networks, a cell may, in fact, consist of one or more "sectors"; the term sector is used to mean a geographic area within a cell that is served primarily by a specific set of frequencies, as well as that set of frequencies. Hereafter, we use the word "cell" interchangeably with the word "sector" to denote a sector.

Each base station 126 is connected to a centralized switch or mobile switching center 128 that provides switching capabilities and acts as a gateway to wired networks such as the public switched telephone network (PSTN), the Internet, and other public and private data communications networks. On the customer side, users connect to the wireless network through wireless mobile nodes or stations 130 that can act as transmitters and receivers. The mobile nodes 130 communicate with the base stations 126 over wireless communications links 138.

In general, the number of calls that a network can handle is based upon the number of channels in the network. With respect to a GSM wireless network, the number of channels depends, in part, on the number of frequencies supported by the base stations. Calls placed when the network's channels are busy are not completed, i.e., are blocked.

As a mobile station 130 moves about in the network 100, it may need to switch between base stations 126 in different cells. Handoff encompasses a process supported between a mobile station and the network that allows the mobile station to move from one cell to another while a call is in progress. If handoff cannot be completed, then the call will likely be dropped or terminated.

If a call is blocked by one base station, then the call may be redirected to one or more alternative base stations that are also accessible to the mobile station This applies both to originating and hand-off calls. This is generally referred to as a directed retry. The purpose of directed retry is to increase the effective capacity of a network by making it possible for calls to be served by multiple base stations (so long as the frequency assignments reduce co-channel interference and provide calls with low-interference access).

The likelihood that the network will not be able to complete a call, i.e., the network blocking probability, is related to the number of calls received by the network, the number of channels in the network, and the routing scheme (the set of redirection sequences) used by the network. Given the network configuration and a routing scheme, a network provider tries to reduce the blocking probability so that fewer calls are dropped.

Of utility then are methods and systems for calculating and predicting call blocking in a network.

SUMMARY OF THE INVENTION

An aspect of the present invention is a method for predicting call blocking in a network having a plurality of serving areas. The method preferably comprises receiving a plurality of inputs associated with the network, including a traffic load and a call routing sequence associated with each serving area and calculating a blocking metric for each serving area based on the traffic loads and the routing sequences for all serving areas including accounting for correlations of loads offered to neighboring sectors.

Most preferably, the method further desirably comprises calculating the overall blocking metric for the network from the traffic loads and blocking metrics for the serving areas.

Further in accordance with this aspect of the present invention, the input data may desirably include the number of channels available in each of the serving areas.

Further still, the network is preferably a wireless network. Most preferably the wireless network operates in accordance with the Groupe Special Mobile standard.

Further in accordance with this aspect of the present invention, the serving areas desirably comprise geographical unites within cells in a wireless network.

In addition, calculating a blocking metric preferably comprises calculating an estimate for the offered load of each sector in the network.

Further still, calculating a blocking metric comprises calculating an estimate of the blocking probability for calls in serving area. Most preferably, calculating the overall blocking metric comprises calculating an estimate of the overall network blocking probability.

In another aspect, the present invention comprises a system for processing data associated with a network. The system desirably comprises an input for receiving a traffic load and a call routing sequence associated with a plurality of bins associated with the network; and a processor operative to calculate a blocking metric for each bin based on the traffic loads and the routing sequences for all bins including accounting for correlations of loads offered to neighboring sectors. Most preferably, the processor is operative to calculate the overall blocking metric for the network based the traffic loads and blocking metrics for the bins.

In accordance with this aspect of the present invention, the input further receives the number of channels available in each of the bins.

Further still, the serving areas desirably comprise geographical units defined within cells associated with a wireless network.

Further in accordance with this aspect of the present invention the processor is desirably operative to compute power levels of base stations associated with the network.

In addition, the input is preferably associated with an object in an object-oriented environment that groups the traffic load and call routing sequence. Further still in accordance with this aspect of the present invention, the traffic load and call routing sequence form the object.

Further in accordance with this aspect of the present invention, the system preferably comprises at least a portion of an operation support system for a telephone network.

DETAILED DESCRIPTION

In the description that follows various aspects of the present invention are described with reference to a network that operates using the Groupe Special Mobile (GSM) standard. However, those skilled in the art will appreciate that the methods and other aspects of the present invention described herein may be implemented in other types of networks.

In a cellular network, the term sector is typically used to mean a group of frequencies intended to serve a certain geographic area, as well as the geographic area served primarily by that set of frequencies. Put another way, the term sector means a base station and its primary group of frequencies and may also refer to the geographic area served primarily by the base station. In early wireless networks, a connection was blocked if all traffic channels were busy in the sector initially chosen. More recently, in GSM networks that employ directed retry, a call that is blocked by the sector of its initial attempt may be redirected to an alternative sector that is also accessible to the call. This increases the capacity of the network by enabling calls to be served by frequencies of multiple sectors. Different groups of calls may, therefore, have access to the different subsets of sectors.

An aspect of the present invention is a method for evaluating call blocking in GSM networks with directed retry, in which a call blocked by the sector of its initial attempt may be redirected to one or more alternative sectors that are also accessible to the call. The purpose of directed retry is to increase the effective capacity of a network by making it possible for calls to be served by the frequencies of multiple sectors (so long as the frequency assignment in sectors reduces co-channel interference and provides calls with low-interference access to multiple sectors). Thus, in accordance with this aspect of the present invention, the method provides as an output a metric or value associated with the blocking probability of a network. The metric or value may be used by a network operator to manage the network, including establishing call sequences that redirect network traffic to sectors or cells in the network such that the capacity of the network is not diminished. The method estimates blocking in networks with directed retry, which can be used, in particular, to compare network performance for different frequency assignments. An efficient method for performance evaluation is attractive, even if its results are only approximate, since the alternative of using detailed simulations can be a very time-consuming process.

Figure 1:
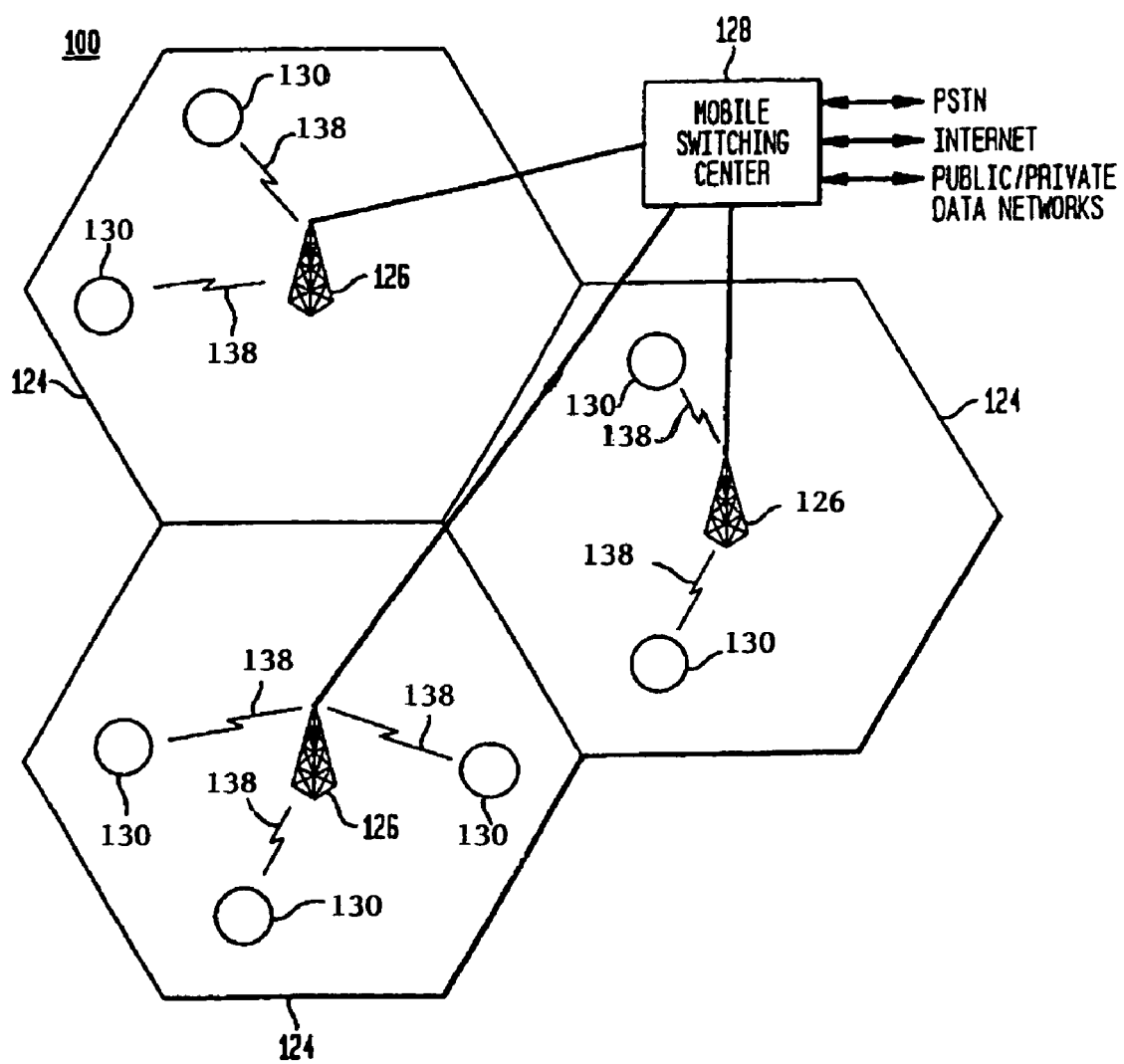
FIG. 1 illustratively depicts a wireless network.
Figure 2:
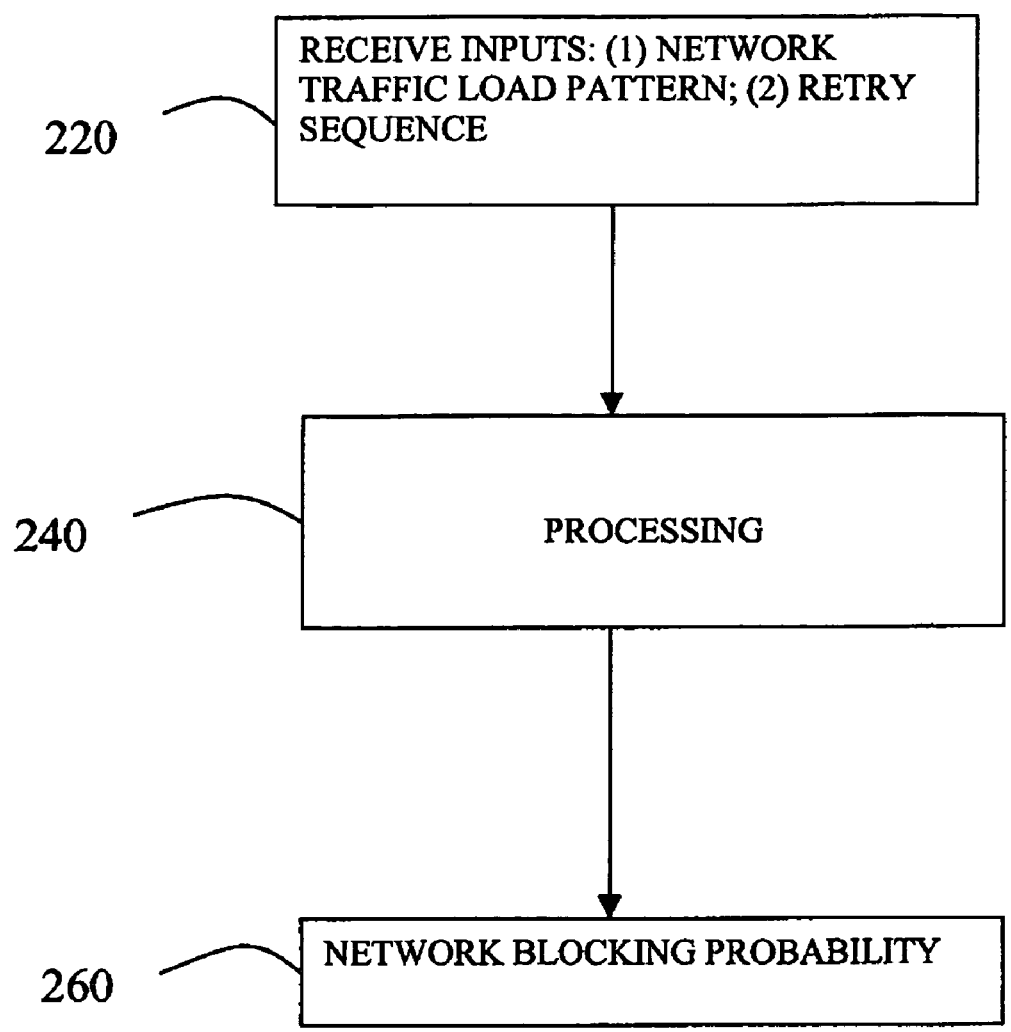
FIG. 2 illustratively depicts a method in accordance with an aspect of the present invention.

Turning now to FIG. 2, there is shown a flow chart illustrating a method or process 200 in accordance with an aspect of the present invention. As shown, the method 200 includes receipt of input data 220, which may include a traffic loading pattern associated with the network and retry sequences for establishing calls. For example, a traffic loading pattern may comprise a traffic load associated with each serving area or a bin as is discussed in further detail below. In some circumstances a serving area or bin may comprise a cell. The input data will typically be provided by a network provider or operator. For example, network operators or designers track and collect data relating to loading of the network and define the sequences for redirecting calls based on the load. The data may be provided on a storage media such as a CD-ROM, but may also be accessible from a database via a network. The data inputs are then processed 240 as discussed in further detail below to produce a network blocking probability metric 260.

Processing (block 240) may be performed using any number of available personal computers including those running on a DOS, Apple or Unix platform. In general, processing may be performed using any microprocessor that can execute a set of instructions stored in memory, including a hard disk, ROM or RAM. The instructions may be stored as software or data as part of an object-oriented software program, or as a standalone software program implemented as compiled instructions (e.g., C++) or as executable instructions.

In accordance with processing step 240, and as discussed in further detail below, the network is visualized as a set of non-overlapping geographical "bins" (e.g., a grid). In general, a bin comprises any geographic area in which calls are subject to the same redirect sequence. A call-origination load for each bin, and the sequence of primary and overflow servers that provide service to calls constituting that load are provided inputs. The call-origination load is defined as the traffic load imposed on the network by calls initiated by users situated in the geographical region of the bin, as well as by continuing calls that were handed off as the user entered the bin. The server-sequence, in general, can correspond to servers in the primary and overflow sectors of directed retry that serve the bin, ranked in decreasing order of signal clarity for calls originating in the bin. Directed retry applies to both initial calls and handoffs. As such, the method determines the blocking experienced by calls originating in or handed-off into each bin, as well as the overall network blocking.

The overall problem may be viewed as one where a set of traffic sources (users in the bins) is served, each by a given subset of servers, attempted in a given sequence of primary and overflow servers, with the different sources possibly limited to different subsets of servers. This corresponds to a generalized limited-availability system, special forms of which have been investigated in the telephony literature. The exact solution of such problems by the analysis of state-evolution of Markov chains is usually rendered unfeasible in realistic-sized networks by the explosion in the number of possible states. Therefore, our method desirably obtains an approximate solution by solving a system of fixed-point equations whose solution is easily obtained by means of an iterative procedure that will often, if not always, converge.

For a user on a mobile phone, a single communication session may require the support of a succession of servers as the user traverses a path through the domain of the network.

From the user's perspective, the one long session is a single call, but from the perspective of the network, the shorter segments of the session (corresponding to different traffic channels, i.e., servers, being used to support different segments of the session upon each handoff) represent different demands on the network. A segment, for example, may comprise each cell that the user traverses or uses for the duration of call (or session). Each segment represents an occasion on which the network might refuse to carry the call. Here we view all occasions of not serving the call (whether in the initial segment or in handoffs) with equal concern, and so we shall treat each segment of a communications session as a separate call; with this language, every call not served initially, and every call dropped during handoff, will be described as a blocked call. A call not served in its initial segment would typically be designated a "blocked" call, while a call that is not served in a later segment would typically be designated a call "dropped" during handoff. We use the terms call and call-segment interchangeably herein to mean call-segment throughout.

The average segment duration is shorter than the average session duration, but the average initiation rate for segments is higher than the average initiation rate for sessions (since a single session can spawn several segments during its life). The magnitude of the overall load, which is the product of an initiation rate and an average duration, is independent of whether the rates and durations refer to segments or to sessions. For the situation being considered here, the relevant magnitude of demand is the product of the segment-initiation rate and average segment duration. In particular, the traffic demand for each segment will be assigned to the bin in which the phone is located at the time the segment is initiated. During a period of interest for performance (such as a busy hour), the demand for call-segments takes the form of a Poisson process. This avoids having to specify the mobility patterns of users.

A call that seeks a traffic channel (time-slot) from a sector can be served by any available traffic channel of any frequency in the sector. Therefore, we regard the combined group of traffic channels corresponding to all the frequencies in a sector as an indivisible server-team, presenting itself as an indivisible unit (which we will sometimes refer to as an 'atom') to all calls that seek service from it. This indivisible server-team corresponding to a sector can be thought of as a full-access trunk-group in the general teletraffic parlance, with the number of 'trunks' equal to the total number of traffic channels in the frequencies serving the sector.

The notation used below is as follows:
T=the set of all sectors in the network
$S_t$=the indivisible server-team (atom) for sector $t \in T$
B=the set of bins in the network
$\lambda_b$=the rate of call-segment originations in bin b (assumed to be a Poisson process)
$\tau_b$=the mean duration of call-segments originating in bin b
$a_b = \lambda_b \tau_b$
$L_b$=the sequence (ordered list) of indivisible server-teams that a call originating in bin b can attempt
$L^U$=the unordered set of the elements in any server-team sequence L
$N_b = N(L_b)$=the total number of servers in $L_b$
$N(L)$=the total number of servers in any server-team sequence L
$|X|$=the number of elements of the set X (ordered or unordered)

An aspect of the present invention is estimating $\beta_b$, the blocking probability for call-segments originating in bin b, $b \in B$. In the course of estimating $\beta_b$, estimates of $z_t$, the load offered to the indivisible server-team $S_t, t \in C$, are also calculated. As stated above, the server-team of a sector presents itself as an indivisible trunk-group to all calls that seek service from it. Hence, $L_b$, the sequence of server-teams accessible to a call-segment originating in bin b, can be viewed as a sequence of trunk-groups. Call-segments originating in bin b attempt the trunk-groups in the specified sequence, but are free to access any idle trunk within each trunk-group.

The various quantities we introduce and calculate are estimates of their true values, derived on the basis of the approximations. In order to avoid introducing burdensome new notation to distinguish each such estimate from the corresponding true value, we re-use the notation introduced for a true value also for its estimate that appears in our calculations, depending on the context to make our meaning clear.

Figure 3:
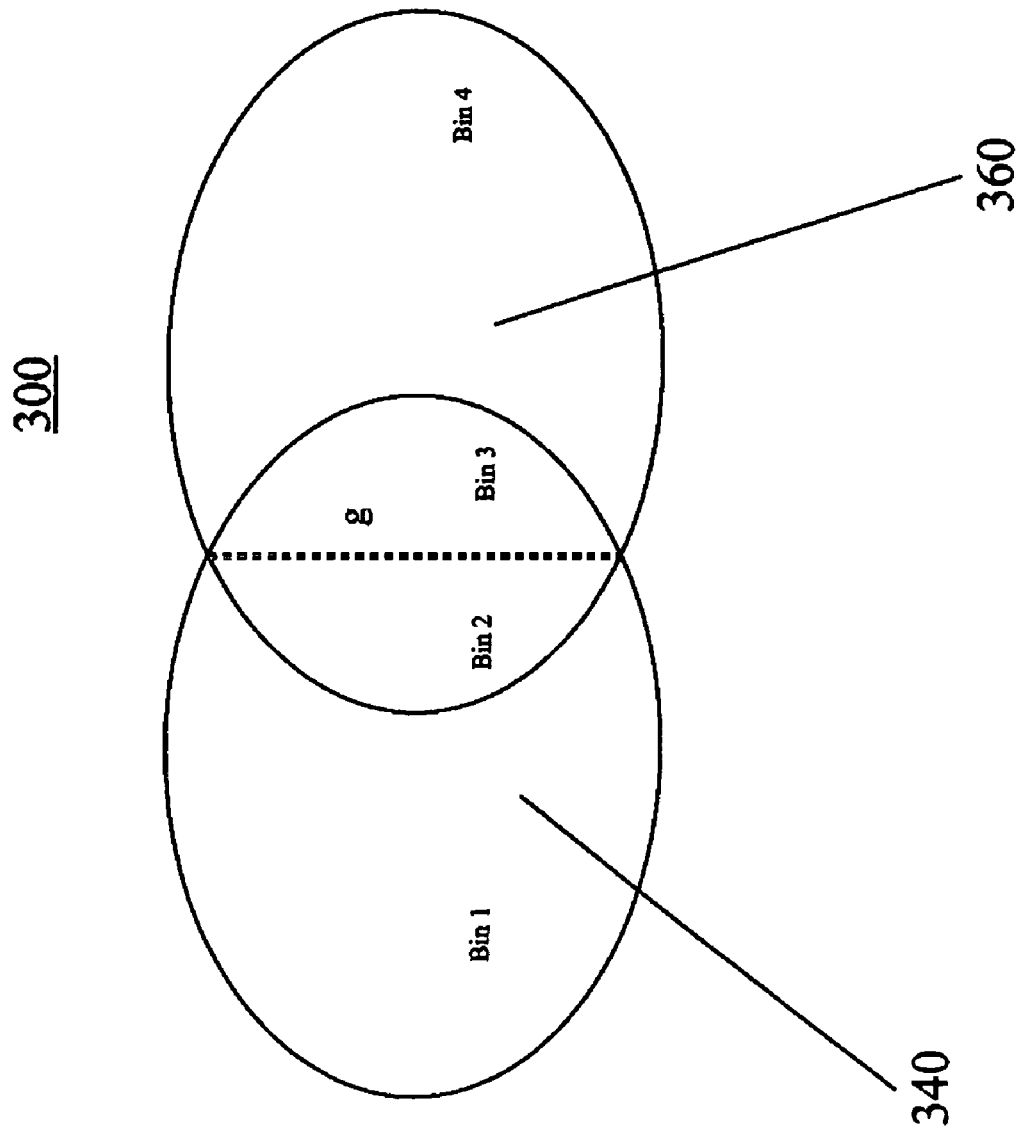
FIG. 3 illustratively depicts a two-sector network in accordance with an aspect of the present invention.

FIG. 3 illustrates an example of a two-sector network that is used in describing the method. The two sectors have a region of mutual overlap, such that calls originating within the region of overlap can be served by the servers of both sectors, while calls originating in the non-overlap region of each sector are served only by the servers of that sector. The line 340 points to the $S_1$ servers and the line 360 points to the $S_2$ servers. Let the combined Poisson offered load of the two sectors be A erlangs, out of which a fraction g arises from the region of overlap. The frequencies in sector 1 correspond to an indivisible server-team $S_1$ with $s_1$ servers and those in Sector 2 correspond to an indivisible server-team $S_2$ with $s_2$ servers.

With the distribution of demand considered symmetric, of the portion A(1−g) of the total load that originates outside the overlap region, we take $$\frac{A(1-g)}{2}$$

to arise from each sector, being served only by the servers of that sector. The load Ag, originating in the region of overlap, is served by a team of $(s_1+s_2)$ servers. However, a mobile in the overlap region does recognize a difference in signal clarity between the frequencies of the two sectors, and its call is set up on a frequency of the clearer sector if a traffic channel is free, otherwise it is attempted on the other sector. Thus, half of the overlap load Ag comes from calls that first attempt the server-team $S_1$, and then, if blocked, overflow to the other server-team $S_2$, while the other half of the load is due to calls that attempt the server-teams in the sequence $S_2 S_1$.

This two-sector network may be viewed as consisting of four bins, as shown in FIG. 3, with the pattern of offered loads and server-sequences shown in Table 1. We return to this example below after describing our performance evaluation method.

TABLE 1

| Bin b | Offered Load $a_b$ | Server Sequence $L_b$ |
|---|---|---|
| 1 | $a_1 = \dfrac{A(1-g)}{2}$ | $S_1$ |
| 2 | $a_2 = \dfrac{Ag}{2}$ | $S_1 S_2$ |

TABLE 1-continued

| Bin b | Offered Load $a_b$ | Server Sequence $L_b$ |
|---|---|---|
| 3 | $a_3 = \dfrac{Ag}{2}$ | $S_2 S_1$ |
| 4 | $a_4 = \dfrac{A(1-g)}{2}$ | $S_2$ |

Given $\{\lambda_b, \tau_b, L_b\}$, $b \in B$, we wish to determine the blocking for the call-segments of the individual bins $\{\beta_b, b \in E\}$, and the overall network blocking $\beta_{net}$, given by $$\beta_{net} = \frac{\sum_b \lambda_b \beta_b}{\sum_b \lambda_b} = \frac{\sum_b \dfrac{a_b \beta_b}{\tau_b}}{\sum_b \dfrac{a_b}{\tau_b}} \quad (1)$$

If the mean holding times are the same for all bins, i.e., $\tau_b = \tau$ for all b, then $$\beta_{net} = \frac{\sum_b a_b \beta_b}{\sum_b a_b} \quad (2)$$

This requires only the bin-loads $\{a_b\}$, without the need for the separate specification of $\{\lambda_b\}$ and $\{\tau_b\}$.

In principle, the exact solution to the problem framed above can be obtained by solving the fundamental state-transition equations of the underlying Markov chain. However, since trunk-group $S_t$ has $[s_t+1]$ states, the total number of states, given by $$\prod_{t \in \mathcal{T}} [s_t + 1],$$

becomes large for realistic-sized networks, and the exact solution raises computational challenges.

For this reason, we express blockings of sets of servers (i.e., server sets) in terms of equivalent loads offered to them. In particular, there is the general case of a set of limited-access trunk-groups, in which different classes of calls might have their access limited to just subsets of the trunk-groups. Instances of limited-access servers known as "graded multiples" are known in the art.

Whether a specific call-segment originating in a bin b gets served depends only on whether or not all the $N_b$ servers of the server-team sequence $L_b$ are occupied at the time that call-segment is offered, regardless of the order in which the servers are attempted. However, the probability that a call originating in bin b is blocked could be influenced by the server-team sequences of all the bins, because those sequences affect the total load imposed on the $N_b$ servers in $L_b$. This dependence arises from the possibility of cascades of blocking, when blocking at one team of servers in one location leads to the redirection of some load to another team at another location, which, in turn, might block and redirect other load to yet another team.

We approximate this complicated dependence of the blocking probability $\beta_b$ of bin b on all the redirected loads by calculating the blocking probability when a single "effective" Poisson load $Y_b$ is offered to the unordered set of servers $L_b^U$. Thus, we estimate $\beta_b$ by the following Erlang-B formula (the appropriateness of the use of the Erlang-B formula will be discussed later):

$$\beta_b = B(N_b, Y_b) \quad (3).$$

We turn now to the derivation of a system of equations from which the loads $\{Y_b\}$ in (3), associated with a particular bin b and offered to the set of servers $L_b^U$, can be obtained. This will be a system of $|T|$ equations, where $|T|$ is the number of sector server-teams, each team being an indivisible atom (full-access trunk-group) to all calls seeking service from it. These server-team atoms are denoted above by $S_1 t \in T$, with $z_t$=the load offered to $S_t, t \in T$.

In deriving the equations for $\{Y_b\}$, we find that we also have to consider loads other than only the $\{Y_b\}$. In the first step, we write equations for the loads offered to each of the atoms $S_1, t \in T$. The formulation of equations for these 'atomic' loads requires us, in general, also to deal with the concept of the load $Y(V)$ offered to a limited-access set V of atoms, in which access for different calls could be limited to different subsets of the component atoms. We begin by writing where, $$z_t = \sum_{b \in B} f_{bt} a_b, \quad (4)$$

$f_{bt}$=fraction of offered load of bin b that is offered to the server—team $S_t$ Now, if $S_t \notin L_b$, then $f_{bt}=0$. If $S_t \in L_b$, we write $L_b = I_{bt} S_t R_{bt}$, where $I_{bt}$ is the initial server-sequence appearing before the appearance of $S_t$ in $L_b$, and $R_{bt}$ is the remainder of the sequence after the appearance of $S_t$. In this case, the fraction of load $a_b$ that is offered to $S_t$ in $L_b$ is the fraction that is blocked by the set of servers $I_{bt}^U$ in the initial sequence $I_{bt}$. Since the number of servers is $|I_{bt}|$, we write $$f_{bt} = B(|I_{bt}|, Y(I_{bt}^U)), \quad (5),$$

where $Y(I_{bt}^U)$ stands for the yet-to-be-defined load 'offered' to the set of servers $I_{bt}^U$.

In the special case where $S_t$ itself is the first element of $L_b$, $f_{bt}=1$; this special case can be included in the above notation by defining, in this case, $I_{bt} \equiv \emptyset$, and further defining $Y(\emptyset) \equiv 0$, $B(0,0) \equiv 1$. We thus have $$z_t = \sum_{b: S_t \in L_b} a_b B(|I_{bt}|, Y(I_{bt}^U)), \quad t \in \mathcal{T}. \quad (6)$$

For $t \in T$, the right hand side of the system of equations (6) involves, in general, offered loads on various unordered sets of servers $V = U_{bt}^U$, which are unspecified as yet. We next specify these loads below as part of the second step.

Consider a general unordered set V of server-team atoms, say, $V = \{S_{t_1}, S_{t_2}, \ldots, S_{t_n}\}$. If n=1, i.e., if V consists of a single server-team, say, $S_t$, then $Y(V)=Y(S_t)=z_t$ and is among the loads to be determined by solution of (6). When $n \geq 2$, it is possible that different subsets of V serve different groups of calls, perhaps with no calls given full access to all the servers in V. Various instances of such limited-access service systems have been studied in the telephony literature. We introduce the following definition of offered load for such a system: For a general set V of two or more atoms (server-teams), a bin-load $a_b$ is considered offered to V if an atom of V appears as the first atom in the server-team sequence $L_b$ serving $a_b$. Thus, if $F(L_b)$ denotes the first server-team in the server-team sequence $L_b$, then, for $V=\{S_{t_1}, S_{t_2}, \ldots, S_{t_n}\}$, with $n \geq 2$, the offered load $Y(V)$ is taken to be $$Y(V) = \sum_{j=1}^{n} \left[ \sum_{b \in \mathcal{B}: F(L_b) = S_{t_j}} a_b \right] \quad (7)$$

= the sum of offered loads of those bins whose server-sequences each begin with a constituent atom of V.

Returning to the equations (6), we can, by invoking (7), re-write them such that the only loads appearing on the right-hand side are the to-be-determined atomic loads $\{z_t\}$ and/or the given offered loads $\{a_b\}$ of the bins in the network. Thus, defining $$\theta_{bt}(z_1, \ldots, z_{|\mathcal{T}|}) = \begin{cases} B(|I_{bt}|, Y(I_{bt}^U)), & \text{if } S_t \in L_b \\ 0 & \text{otherwise} \end{cases},$$

we reduce (6) to a system of $|\mathcal{T}|$ equations for the $|\mathcal{T}|$ variables $\{z_t\}$, of the following form:

$$z_t = \sum_{b \in \mathcal{B}} a_b \theta_{bt}(z_1, \ldots, z_{|\mathcal{T}|}), \quad t \in \mathcal{T}. \quad (8)$$

When the load offered to a server-team includes load overflowing from other server-teams, the load has higher peakedness than a Poisson load of the same value, and the use of the Erlang-B formula in (6) tends to underestimate the true blocking. On the other hand, the use of (8) in (6) tends to overestimate the probability of all servers in V being busy, because the summation in (8) could include loads that do not receive service from some of the atoms, and thus cannot raise the occupancies of those servers in the set. Thus, to some extent, the errors involved in (6) and (8) above offset each other, as supported by the results of the examples presented below.

Here we show that equation (8) can be solved by a simple iterative procedure that is guaranteed to converge to a solution. A key to the proof of convergence will be the fact that, because of equation (5), each coefficient $f_{bt} = \theta_{bt}(z_1, \ldots, z_{|\mathcal{T}|})$ represents a blocking probability, and so $$0 \leq \theta_{bt}(z_1, \ldots, z_{|\mathcal{T}|}) \leq 1, b \in B, t \in T \quad (9)$$

Define $z_t^0 = 0$ for $t \in T$, and for $k \geq 0$, define $$z_t^{k+1} = \sum_{b \in \mathcal{B}} a_b \theta_{bt}(z_1^k, \ldots, z_{|\mathcal{T}|}^k)$$

Since $z_t^0 = 0$ and $\theta_{bt}(z_1^k, \ldots, z_{|\mathcal{T}|}^k) \geq 0$, it follows that $z_t^1 \geq z_t^0$; also, as the Erlang-B blockings represented by the coefficients $\{\theta_{bt}\}$ are increasing functions of loads, it follows that, in general, $z_t^{k+1} \geq z_t^k$ for each $t \in T$. Since, in view of (9), each $$z_t^k \leq \sum_{b \in \mathcal{B}} a_b,$$

it follows that, for each $t \in T$, the sequence $\{z_t^k\}$, is monotonically non-decreasing and bounded, and hence converges to a unique limit $z_t^\infty$, which, owing to the continuity of the Erlang-B formula with respect to load, satisfies (8). Thus, a solution can be established.

However, establishing the uniqueness of the solution is not straightforward. We describe a procedure that establishes upper and lower bounds on the solution. This helps to determine whether, for given loads and server-sequences, the solution is, in fact, unique. Let $$A = \sum_{b \in \mathcal{B}} a_b.$$

For comparison with the increasing sequences $\{z_t^k\}$ above, define $\varsigma_t^0 = A$ for $t \in T$, and for $k \geq 0$, define for $t \in T$, $$\varsigma_t^{k+1} = \sum_{b \in \mathcal{B}} a_b \theta_{bt}(\varsigma_1^k, \ldots, \varsigma_{|\mathcal{T}|}^k).$$

Notice that, with basically the same reasoning as was used with the sequences $\{z_t^k\}$, the sequences $\{\varsigma_t^k\}$ are bounded and monotonically non-increasing, converging to limiting values $\varsigma_t^\infty$ that together satisfy (8). Thus, the iterative procedure produces two, possibly identical, solutions of (8): $\{z_t^\infty\}$ and $\{\varsigma_t^\infty\}$. Consider now an arbitrary solution $\{z_t\}$ of (8). Notice that $z_t^0 = 0 \leq z_t \leq A = \varsigma_t^0$, so that, by the same monotonicity arguments that have already been employed, $z_t^k \leq z_t \leq \varsigma_t^k$ for all k, and so $z_t^\infty \leq z_t \leq \varsigma_t^\infty$. Thus, $\{z_t^\infty\}$ is the minimal solution of (8), while $\{\varsigma_t^\infty\}$ is the maximal solution. In particular, if $z_t^\infty = \varsigma_t^\infty$ for all $t \in T$, then the solution is unique. In practical terms, if one halts the iterative calculation at a finite stage k at which the differences $\varsigma_t^k - z_t^k$ are satisfyingly small, then the bounds $z_t^k \leq z_t \leq \varsigma_t^k$ show that the solution is basically identified to within one's desired accuracy. Since we have no proof of uniqueness in general, cases of multiple solutions may exist, and in such cases, the differences $\varsigma_t^k - z_t^k$ would decrease to limits that are not all zero. In any case, our proposed calculations can determine whether or not the solution is unique for a network with given loads and server-sequences.

We now apply the performance evaluation method developed with reference to the simple two-sector network example that is shown in FIG. 3. For this example (for which the loads and server-sequences are summarized in Table 1), an exact solution is, in fact, feasible, and available for comparison with the results produced by our method.

For this example, $|T| = 2$, $|B| = 4$, and Equations (6) take the form:

$$z_1 = a_1 + a_2 + a_3 B(s_2, z_2) = \frac{A}{2} + \frac{Ag}{2} B(s_2, z_2)$$

$$z_2 = a_2 B(s_1, z_1) + a_3 + a_4 = \frac{Ag}{2} B(s_1, z_1) + \frac{A}{2}$$

and are readily solved by the iterative method described above.

Since we have $$L_1 = S_1$$

$$L_2 = S_1 S_2$$

$$L_3 = S_2 S_1$$

$$L_4 = S_2$$

we obtain, $$Y_1 z_1$$

$$Y_2 = a_1 + a_2 + a_3 + a_4 = A$$

$$Y_3 = a_1 + a_2 + a_3 + a_4 = A$$

$$Y_4 = Z_2$$

from which we obtain the bin-blockings $\{\beta_b\}$ and the network blocking $\beta_{net}$ as follows:

$$\beta_1 = B(s_1, z_1)$$

$$\beta_2 = B(s_1 + s_2, A)$$

$$\beta_3 = B(s_1 + s_2, A)$$

$$\beta_4 = B(s_2, z_2)$$

and $$\beta_{net} = \frac{\sum_{b \in B} a_b \beta_b}{\sum_{b \in B} a_b} = \begin{cases} \frac{(1-g)}{2}[B(s_1, z_1) + B(s_2, z_2)] + \\ gB(s_1 + s_2, A) \end{cases}$$

For the case of two symmetrical sectors, each with s=7 servers, the exact solution can be obtained by analysis of the Markov chain that describes the evolution of the occupancy-vector of the two server-teams $(S_1, S_2)$. The number of possible states is $(s_1+1)(s_2+1)=64$, and well-established numerical methods were used to determine the equilibrium state probabilities.

Instead of making the comparison in terms of the individual bin blockings in the two solutions, we compare the capacity that is obtained in the 2-sector network by having enabled a portion of the traffic to be served by server-teams of both sectors. In particular, under the performance constraint $\beta_{net} \leq 0.01$, we estimate the total network load A in erlangs that can be served, for various values of the degree of overlap g. We present in Table 2 a comparison of the exact solution with the approximate solution proposed here. For reference, we also include the trivial linear approximation consisting of mere interpolation between the known values at g=0(no overlap) and g=1(coincident cells). The interpolated result, overestimates the capacity, and is subject to a maximum error of 7.5%. We note that the approximation discussed above slightly underestimates the capacity, but is typically highly accurate: for the cases considered, the relative error never exceeds 1.25%, and the mean relative error is only about 0.55%.

TABLE 2

| g | Exact Solution (E) | Proposed Method (M) | Linear Interpolation (L) | % Error in M $\left(\frac{E-M}{E}\right)*100$ | % Error in L $\left(\frac{E-L}{E}\right)*100$ |
|---|---|---|---|---|---|
| 0.0 | 5.00188 | 5.00188 | 5.00188 | 0.00 | 0.00 |
| 0.1 | 5.11292 | 5.10827 | 5.23686 | 0.09 | -2.42 |
| 0.2 | 5.23910 | 5.22852 | 5.47184 | 0.20 | -4.44 |
| 0.3 | 5.38400 | 5.36582 | 5.70682 | 0.34 | -6.00 |
| 0.4 | 5.55228 | 5.52434 | 5.9418 | 0.50 | -7.02 |
| 0.5 | 5.74981 | 5.70951 | 6.17678 | 0.70 | -7.43* |
| 0.6 | 5.98360 | 5.92842 | 6.41176 | 0.92 | -7.16 |
| 0.7 | 6.26071 | 6.19001 | 6.64674 | 1.13 | -6.17 |
| 0.8 | 6.58539 | 6.50520 | 6.88172 | 1.22* | -4.50 |
| 0.9 | 6.95406 | 6.88686 | 7.1167 | 0.97 | -2.34 |
| 1.0 | 7.35168 | 7.35168 | 7.35168 | 0.00 | 0.00 |

We also carried out similar calculations for a symmetric 3-sector network, with 7 servers in each sector. Such a 3-sector network may be viewed as consisting of 15 "bins". For a range of sector overlaps, we again calculated the percentage error in the estimated total offered load that could be supported at a 1% blocking level. The degree of mutual overlap was described by the fraction of calls in the network that had access to only their "home" sector, to only two sectors, and to all three sectors. The number of states in a corresponding Markov chain would be 512; however, because we assumed symmetry, we could perform an exact Markov-chain analysis with only 120 states. We found that the maximum relative error between the exact solution and the approximation furnished by our method was less than 3.3%.

Figure 4:
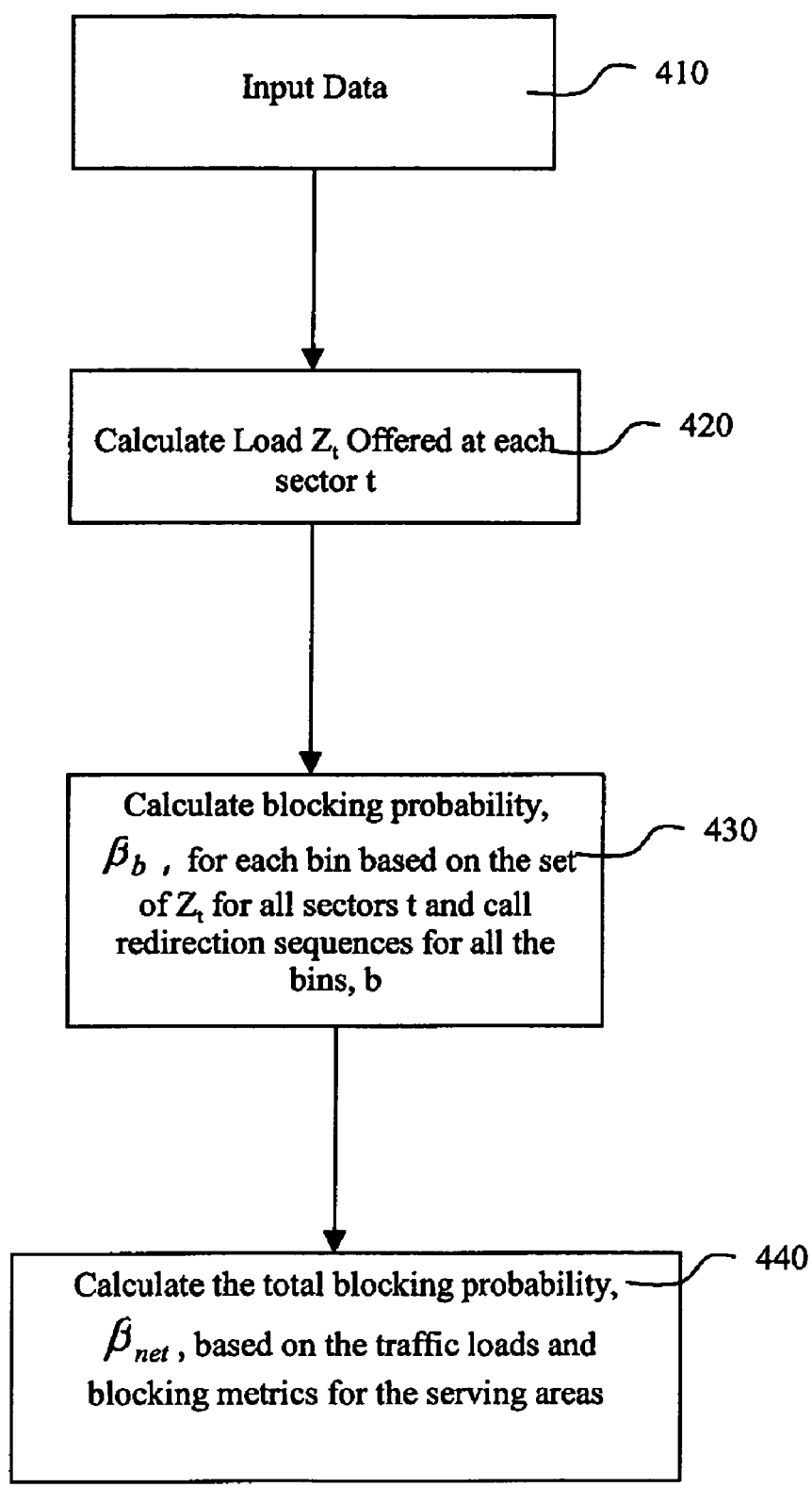
FIG. 4 illustratively depicts a method in accordance with an aspect of the present invention.

In view of the foregoing, the method or process for computing the overall blocking probability of the network is as illustrated in FIG. 4. As shown, the method begins with the reception of input data at block 410. The input data may comprise the number of frequencies in each cell (e.g., trunk-group size), the call origination load and call attempt sequence for each bin. The load offered to each sector is then calculated at block 420. The blocking probability for each bin is then calculated at block 430 using the sequences for redirecting calls. At block 440, the total blocking probability for the network is then calculated by using the load offered and blocking probability for each bin Calculation of a network blocking probability in accordance with the foregoing aspects of the present invention allows for more accurate forecasting. For example, a network service provider may invest in additional cell sites based on the blocking probability metric. In addition, the investment may be tailored such that each cell site can employ redirect sequences that minimize network blocking probability. In another aspect, the blocking probability may be used to adjust the power levels of the base station antennas such that particular base stations or cells offset overloaded base stations or cell. In this way, a network can be managed more intelligently, reducing the number of calls being blocked or dropped, which results in greater use and cost savings.

The method and process described above may be implemented by an operating support system (OSS) for a communications network. For example, a software module comprising the method may form an object module in a larger object oriented program.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for predicting call blocking in a network having a plurality of geographical serving areas, the method comprising:
   receiving at an input signals representing originating traffic loads and call routing sequences for a plurality of geographical serving areas;
   calculating, by a computing device, respective blocking metrics for the geographical serving areas based on the originating traffic loads and the call routing sequences for directed retry specified for the geographical serving areas including intermediate calculations of an effective load and blocking per sector, including accounting for correlations of effective loads offered to neighboring sectors as a result of a call blocked by a serving sector or cell of its initial attempt being redirected to one or more alternative sectors or cells that are also accessible to the call;
   the calculating respective blocking metrics comprising iteratively solving an equation set based at least in part on the call routing sequence such that the iteratively solving converges to a solution or to a value bound by upper and lower limits; and
   calculating at the computing device an overall blocking metric for the network based on the originating traffic loads and the respective blocking metrics for the geographical serving areas.

2. The method of claim 1, wherein the receiving comprises receiving signals representing the number of channels available in the serving areas.

3. The method of claim 1, wherein calculating at the computing device the overall blocking metric for the network includes calculating an overall blocking metric for a wireless network.

4. The method of claim 1, wherein calculating respective blocking metrics for the geographical serving areas includes calculating respective blocking metrics for geographical units defined within cells in a wireless network.

5. The method of claim 1, wherein calculating a blocking metric comprises calculating an estimate for the offered load of each sector individual sectors in the network.

6. The method of claim 1, wherein calculating a blocking metric further comprises calculating an estimate of blocking probability for calls in a sector.

7. The method of claim 1, wherein calculating the overall blocking metric comprises calculating an estimate of overall network blocking probability.

8. A system for processing data associated with a network having a plurality of geographical serving areas, the system comprising:
   an input configured to receive signals representing an originating traffic load and a call routing sequence for each of a plurality of geographical serving areas; and
   a processing device operative to calculate respective blocking metrics metric for the geographical serving areas based on the originating traffic loads and the call routing sequences for the geographical serving areas, including intermediate calculations of effective load and blocking per sector, including accounting for correlations of effective loads offered to neighboring sectors, whereby a call blocked by a serving sector or cell of its initial attempt may be redirected to one or more alternative sectors or cells that are also accessible to the call;
   wherein said processing device is operative to iteratively solve an equation set based at least in part on the call routing sequence such that the iteratively solving converges to a solution or to a value bound by upper and lower limits; and
   wherein said processing device is operative to calculate an overall blocking metric for the network based on the originating traffic loads and the respective blocking metrics calculated for the geographical serving areas.

9. The system of claim 8, wherein the input is further configured to receive signals representing a number of channels available in respective ones of the serving areas.

10. The system of claim 8, wherein the serving areas comprise geographical units defined within a wireless network.

11. The system of claim 8, wherein the processing device is configured to operate in one of a DOS platform, an Apple platform, or a Unix platform.

12. The system of claim 8, wherein the processing device is further configured to compute power levels of base stations associated with the network.

13. The system of claim 8, wherein the input is configured to receive signals representing data for association with an object in an object-oriented environment that groups the originating traffic loads and the call routing sequence sequences.

14. The system of claim 13, wherein the processing device is further configured to process data representing the originating traffic loads and the call routing sequences form the in an object-based representation.

15. The system of claim 8, wherein the system comprises at least a portion of an operation support system for a telephone network.

16. A method for predicting call blocking in a network having a plurality of geographical serving areas, the method comprising:
   receiving at an input signals representing originating traffic loads and call routing sequences for a plurality of geographical serving areas;
   calculating, by a computing device, respective blocking metrics for the geographical serving areas based on the originating traffic loads and the call routing sequences, including intermediate calculations of an effective load and blocking per sector, including accounting for correlations of effective loads offered to neighboring sectors as a result of a call blocked by a serving sector or cell of its initial attempt being redirected to one or more alternative sectors or cells that are also accessible to the call, wherein the call routing sequences comprise redirection sequences used by the network to retry calls that are blocked;
   the calculating respective blocking metrics comprising iteratively solving an equation set based at least in part on the call routing sequence, such that the iteratively solving converges to a solution or to a value bound by upper and lower limits; and calculating, by the computing device, an overall blocking metric for the network based on the originating traffic loads and the blocking metrics calculated for geographical serving areas.

17. The method of claim 16, further comprising receiving signals representing a number of channels available in respective ones of the serving areas.

18. The method of claim 16, wherein calculating, by a computing device, respective blocking metrics for the geographical serving areas comprises calculating respective blocking metrics for geographical units defined within cells in a wireless network.

19. The method of claim 16, wherein calculating a blocking metric comprises calculating an estimate for an offered load of at least one sector in the network.

20. The method of claim 16, wherein calculating a blocking metric further comprises calculating an estimate of blocking probability for calls in at least one sector.

21. A method for managing call blocking in a network having a plurality of geographical serving areas, the method comprising:
  receiving at an input signals representing blocking levels and call routing sequences for a plurality of geographical serving areas;
  calculating, by a computing device, a traffic load for the network based on the blocking levels and the call routing sequences, including intermediate calculations of an effective load and blocking per sector, including accounting for correlations of effective loads offered to neighboring sectors as a result of a call blocked by a serving sector or cell of its initial attempt being redirected to one or more alternative sectors or cells that are also accessible to the call, wherein the call routing sequences comprise redirection sequences used by the network to retry calls that are blocked;
  wherein the calculating a traffic load comprises iteratively solving an equation set based at least in part on the call routing sequence, such that the iteratively solving converges to a solution or to a value bound by upper and lower limits.

22. An apparatus for processing data associated with a network having a plurality of geographical serving areas, the apparatus comprising:
  an input configured to receive signals representing blocking levels and call routing sequences for a plurality of geographical serving areas; and
  a processing device configured to calculate a traffic load for the network based on the blocking levels and the call routing sequences for the plurality of geographical serving areas, including intermediate calculations of an effective load and blocking per sector, including accounting for correlations of effective loads offered to neighboring sectors as a result of a call blocked by a serving sector or cell of its initial attempt being redirected to one or more alternative sectors or cells that are also accessible to the call;
  wherein said processing device is configured to iteratively solve an equation set based at least in part on the call routing sequence, such that the iteratively solving converges to a solution or to a value bound by upper and lower limits.

* * * * *

UNITED STATES PATENT AND TRADEMARK OFFICE
CERTIFICATE OF CORRECTION

| | | |
|---|---|---|
| PATENT NO. | : 7,904,091 B2 | Page 1 of 1 |
| APPLICATION NO. | : 11/125721 | |
| DATED | : March 8, 2011 | |
| INVENTOR(S) | : Neidhardt et al. | |

It is certified that error appears in the above-identified patent and that said Letters Patent is hereby corrected as shown below:

On the Title Page, item (56), under "Other Publications", Line 3, delete "Institue" and insert -- Institute --.

Column 13, line 55, in Claim 5, delete "of each sector individual" and insert -- of individual --.

Column 14, line 2, in Claim 8, delete "metrics metric" and insert -- metrics --.

Column 14, lines 36-37, in Claim 13, delete "sequence sequences. " and insert -- sequences. --.

Column 14, line 40, in Claim 14, delete "sequence form the in" and insert -- sequences in --.

Column 15, lines 3-4, in Claim 16, delete "for geographical" and insert -- for the geographical --.

Signed and Sealed this
Fifth Day of July, 2011

David J. Kappos
*Director of the United States Patent and Trademark Office*